United States Patent
Johnson

(10) Patent No.: US 9,531,287 B1
(45) Date of Patent: Dec. 27, 2016

(54) RECREATIONAL VEHICLE TRANSFORMER

(76) Inventor: John Michael Johnson, Vicksburg, MI (US)

(*) Notice: Subject to any disclaimer, the term of this patent is extended or adjusted under 35 U.S.C. 154(b) by 732 days.

(21) Appl. No.: 13/373,718

(22) Filed: Nov. 28, 2011

(51) Int. Cl.
*H02M 1/10* (2006.01)
*H02M 1/00* (2006.01)
*H02M 5/12* (2006.01)

(52) U.S. Cl.
CPC ....................... *H02M 5/12* (2013.01)

(58) Field of Classification Search
CPC ...................................... H02M 5/12
USPC ........................................ 323/258
See application file for complete search history.

(56) References Cited

U.S. PATENT DOCUMENTS

| | | | | |
|---|---|---|---|---|
| 4,075,504 A | * | 2/1978 | Gnaedinger | 307/66 |
| 4,447,844 A | * | 5/1984 | Schossow et al. | 361/77 |
| 5,936,828 A | * | 8/1999 | Nolan et al. | 361/167 |
| 5,969,507 A | * | 10/1999 | Meyer | 320/137 |
| 6,108,226 A | * | 8/2000 | Ghosh et al. | 363/142 |
| 6,608,406 B2 | * | 8/2003 | Bersiek | 307/125 |
| 8,469,725 B2 | * | 6/2013 | Walls, Jr. | 439/105 |
| 2004/0027740 A1 | * | 2/2004 | Huang et al. | 361/42 |
| 2005/0250375 A1 | * | 11/2005 | Allison | 439/502 |
| 2010/0201309 A1 | * | 8/2010 | Meek | 320/108 |
| 2012/0270435 A1 | * | 10/2012 | Hale et al. | 439/476.1 |

* cited by examiner

*Primary Examiner* — Emily P Pham
(74) *Attorney, Agent, or Firm* — Joseph K. Andonian

(57) ABSTRACT

A transformer with a receptacle uniquely adapted on one side to receive the plug on the end of the power cord of a U.S. built 30 A RV and a plug on the other side adapted to connect to receptacles in foreign campgrounds and thereby convert 220 volts of electricity to 110 volts. The transformer also employs a circuit breaker in the hot lead from the circuit employed in the transformer.

2 Claims, 4 Drawing Sheets

US 9,531,287 B1

RECREATIONAL VEHICLE TRANSFORMER

This invention relates to a recreational vehicle (RV) transformer that is suitable for connecting 30 Amp recreational vehicles built for use in the United States to electrical outlets located outside the U.S., most especially in Europe. The invention claimed herein differs from that disclosed and claimed in my application Ser. No. 12/661,922 filed Mar. 26, 2010 in that it has plug and play utility when used in U.S. manufactured small or 30 A RVs requiring less current than large 50 A RVs. The earlier application had plug and play utility for comparable large 50 A RVs. The present invention uses a circuit that performs essentially the same function as part of the circuit present in the transformer claimed in the earlier application.

BACKGROUND OF INVENTION

Electrical outlets in the U.S. generally provide 110 volts, 60 hz and 30-50 amps of electricity. Electrical outlets in Europe generally provide 220 volts, 50 hz and 16 amps of electricity. Most foreign countries have 220 volt systems. RVs built in the U.S. are wired for 110-120 volt systems. The large RVs generally require 50 amperes of current (generally referred to as a 50 A RV) and smaller RVs generally require 30 amperes (generally referred to as a 30 A RV). While an ordinary transformer can convert 220 volts to 110 volts with sufficient current for use in a 30 A RV, it does not have plug and play capability.

BRIEF SUMMARY OF INVENTION

Disclosure of Invention

The transformer of the present invention provides a transformer that can be connected between the electrical cord of a U.S. 30 A RV and thence most significantly directly into European and most other foreign receptacles providing from 220 to 240 volts, 50 hertz (hz) and 16 amps of electricity. The present invention thereby converts 220-240 volts to 110-120 volts, 60 hz and 30 amps of electrical current with plug and play convenience from European campgrounds to U.S. built 30 A RVs. U.S. built RVs are often shipped for use or sale overseas, particularly Europe, where they are rewired at a cost of several thousand dollars to fit European campgrounds. The present transformer in contrast costs less than one thousand dollars, a considerable saving. The U.S RV can thereby be used in both U.S. and European locations without modification.

It is therefore an object of this invention to provide a transformer designed specifically for use with 30 A recreational vehicles built in the U.S. for use abroad without rewiring the RV.

It is a further object of this invention to provide a unique transformer with the Plug and Play convenience whereby a user can plug a U.S.-made RV into the secondary or output side of the transformer and then plug the primary or input side of the transformer into overseas electrical sockets to provide full use of the electrical appliances in the RV.

It is a further object of this invention to provide a transformer that can convert a vehicle wired for 120 volts for use in locations providing 220 volts, such as Europe, with the added safety and security of a circuit breaker on its hot lead.

The electrical units used in this specification include volts, hertz and amperes. A "volt" is sometimes abbreviated to "V"; a "hertz" is sometimes abbreviated to "hz"; and "amperes" is sometimes abbreviated to "amps" or "A". "Electrical outlets" are sometimes referred to as "receptacles", "sockets" or "power points". 50 A receptacles have 4 terminals, two of which are hot. 30 A receptacles have 3 terminals, one of which is hot. Plugs have 4 prongs to fit 50 A receptacles, and 3 prongs to fit 30 A receptacles. Although most foreign electrical outlets provide 220 volts of electricity, their output is variable and can go as high as 240. Likewise most U.S. RVs are wired for 120 volts of electricity but they can function on voltages between 110 and 120. For purposes of this specification 220 volts can be assumed to be equivalent to the range of 220 to 240 volts and 110 can be assumed to be equivalent to the range of 110 to 120 volts as long as the ratio of approximately 2 to 1 is also assumed from the input side of the transformer to the output side. Since the electrical potential (volts), frequency (hertz) and current (amperes) of the electricity supplied in the U.S. and abroad vary from time to time and the efficiency of any electrical appliance including the present transformer is limited, the electrical units specified throughout this specification and claims are necessarily approximate.

The novel features of the 50 A transformer of my earlier application include the use of two cords emanating from the input side of a transformer for connection to the two receptacles generally provided in a single location in a European or overseas campground. The cords are hard wired at one end into the primary circuit of the transformer and include a four pronged plug at their other ends. The novel features of the 30 A transformer of the present invention include the use of a receptacle (i.e., a female fitting) on the output side of the transformer that will readily accept the electrical plug (i.e., a male fitting) already present in the power cord of a U.S. manufactured 30 A RV in addition to a single cord that is suitable for direct connection to most receptacles in a foreign campground. Another novel feature of the present invention is the provision of a circuit breaker for the hot lead emanating from the output side of the transformer.

For decades the RV industry has rewired U.S. built RVs for shipment overseas, especially to Europe, to make them compatible with 220 volt systems that are available in foreign campgrounds. The present invention offers plug-and-play convenience at less than half the cost of rewiring to accomplish the same purpose without permanently changing the basic electrical system of the RV. In short, with the advent of the present invention, the 30 A RV can be conveniently and inexpensively connected to either a 110 or a 220 volt source of electrical current. The inventive step of the present invention is the recognition of a long felt need and then adapting the transformer to the existing practices of the RV industry, most especially by designing a transformer with a receptacle that matches the unique configuration of the standard plug employed by the industry on the end of the 30 A RV power cord. The standard plugs on the power cords of 30 A RVs cannot be connected to the standard receptacles of presently available transformers.

In its broadest sense the present invention comprises a transformer for use in a U.S. built 30 Amp recreational vehicle having (1) an input side and an output side and (2) a circuit capable of converting 220 volts of electricity to 120 volts of electricity comprising
  (a) a cord having a first end and a second end, hard wired at the first end into the circuit on the input side of the transformer and a plug on its second end suitable for connection to a receptacle from an outside source of electricity providing 220 volts of electricity and (b) a receptacle on the output side of the transformer suitable for receiving an industry wide standard plug connected to a power cord from the 30 Amp recreational vehicle.

More specifically the foregoing transformer also converts 16 amps of current from the transformer plug to 30 amps of current to the receptacle on the output side and has as a circuit breaker on the circuit's hot lead.

LIST OF REFERENCE NUMERALS FOR THE 30 A TRANSFORMER

Figure 1:
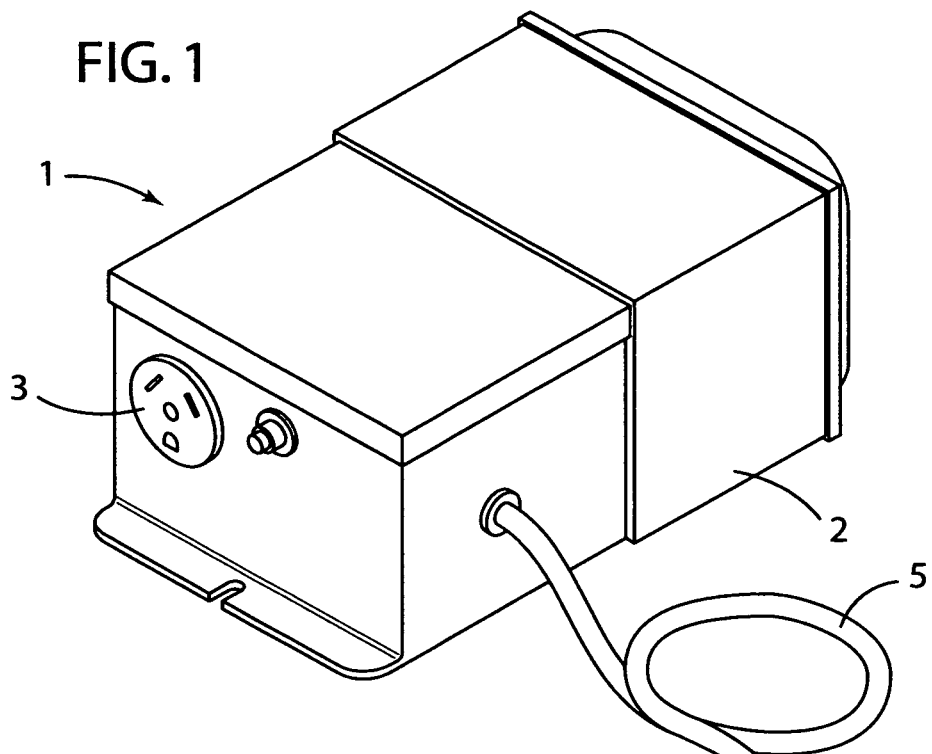
FIG. 1 is a perspective view of the 30 A transformer angled to show the output side of the transformer.

1 Transformer
2 Housing
3 Receptacle
4 Circuit breaker
5 Cord
6 Plug of transformer
7 Circuit
8 Neutral lead
9 Ground
10 Hot lead
11 Core
12 Neutral lead from core
13 Ground from receptacle
14 Hot lead from core
15 30 A RV
16 RV power cord
17 Campground receptacle
18 Screw hole
19 Hot lead receptor
20 Neutral lead receptor
21 Ground receptor
22 RV plug

DETAILED DISCLOSURE OF INVENTION

Best Mode of Carrying Out Invention

Figure 3:
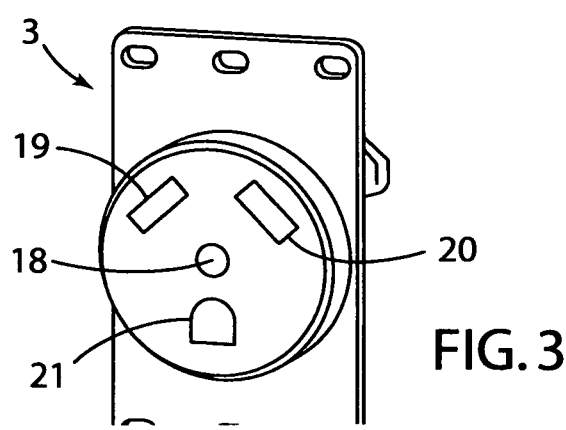
FIG. 3 is an exploded view of the receptacle on the output side of the transformer to identify more clearly the female parts (receptors) of the receptacle.
Figure 2:
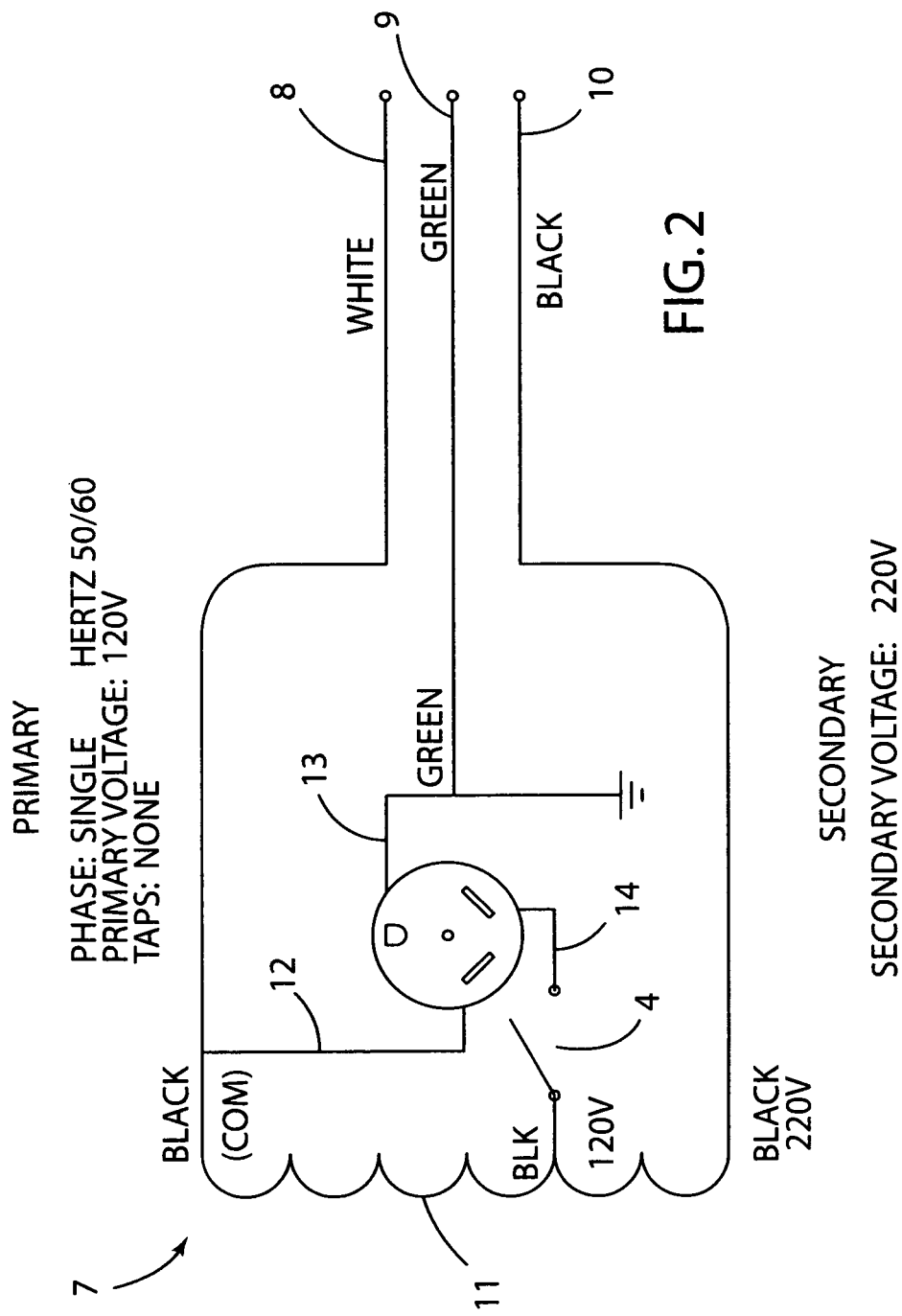
FIG. 2 is a diagram of the electrical circuit employed in the 30 A transformer.
Figure 4:
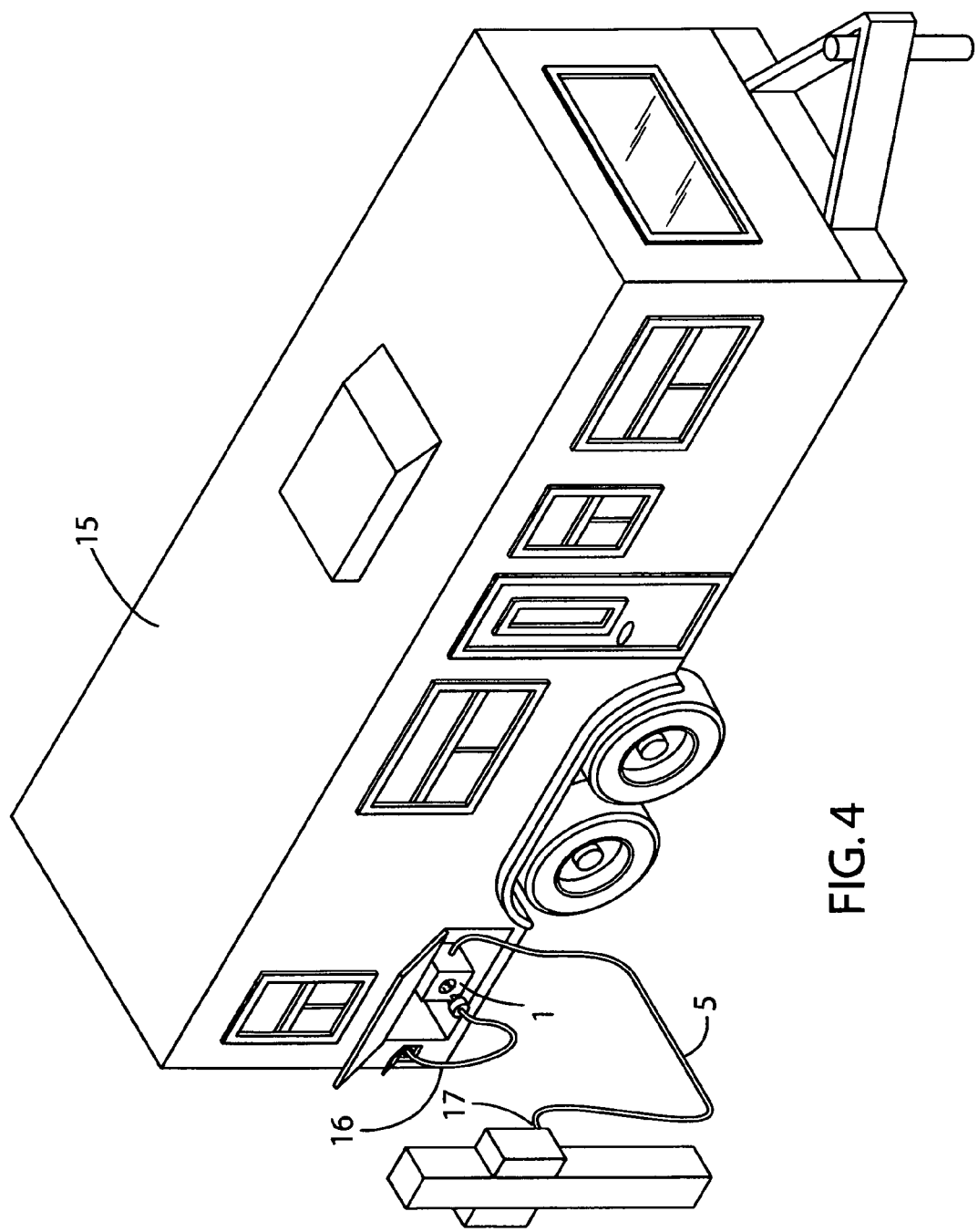
FIG. 4 is a perspective drawing showing the 30 A transformer (angled to show the input side of the transformer) connected between an RV and a campground receptacle.

A perspective view of the transformer 1 of the present invention is shown in FIG. 1. The circuit diagram of the transformer 1 is shown in FIG. 2. FIG. 3 identifies more clearly the parts of the receptacle 3, namely the screw hole 18, the hot lead receptor 19, the neutral lead receptor 20 and the ground receptor 21. FIG. 4 depicts the transformer 1 connected between a travel trailer 15 to a campground socket 17.

Three wires 8, 9 and 10 emanate from the three-pronged plug 6 (not specifically shown in FIG. 2) to match the three-pronged sockets found in most foreign campgrounds. The white neutral lead 8 and the black hot lead are connected to the input side of the core 11 of the transformer 1. The green ground lead 9 connects the plug 6 and the output receptacle 3 to the ground. Two wires 12 and 14 connect the core 11 to the output receptacle 6.

Theoretically a transformer like that described is capable of converting 220 volts and 16 amps of current to 110 volts and 32 amps of current to the hot lead 11 but some loss of efficiency is bound to occur in the conversion.

Using the foregoing embodiment of the present invention the user can simply (1) plug the shore line power cord 16 of an RV 15 into the 30 amp output receptacle 6 located on the output side of the transformer 1 and (2) plug the cord 5 located on the input side of the transformer 1 into the 220 volt campground receptacle 17. The user would then have full use of the electrical appliances in a 30 A RV.

Figure 5:
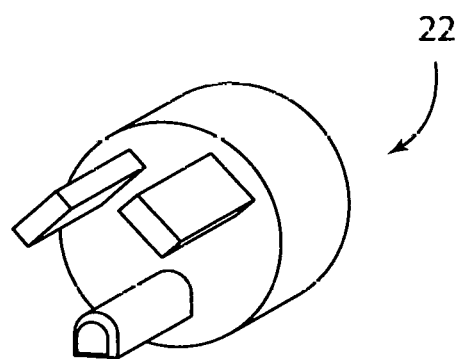
FIG. 5 is a drawing of the plug on the end of the power cord of a 30 A RV.

The preferred embodiment of the present transformer 1 is shown in FIG. 1 and comprises the following electrical specifications:

STYLE: NEMA—Enclosed, Air Cooled, Dry Type
Single Phase General Purpose Auto Transformer
Primary Voltage: 220 Volts
Frequency: 50/60 hz
Secondary Voltage: 120 Volts
Rating: 5 KVA
Insulation System: 180 degrees Celcius
Temp Rise: 115 degrees Celcius The foregoing preferred embodiment can be produced using manufacturing procedures well known to those skilled in the art of producing transformers using the following components:

Transformer-Dry Type General Purpose Autotransformer Copper Wound
Circuit Breaker Thermal 30 A PNL MNT-1658-G21-01-P10-30 A
30 A RV Receptacle-Leviton nmfet#3201415 or R50-07313-000
Power Cord: Carol Cable, part number CORD SOOW12/3BLK; 12/3 90C 600V
Enclosure-NEMA 3R This shielded global RV power unit (GRVP) 1 possesses a 30 AMP 3 Pole Receptacle 3 installed with a 30 AMP 1 Pole Circuit Breaker 4 on the Output, the receptacle or socket 3 being suitable for connection to the unique three pronged plugs shown in FIG. 5 that are standard equipment in a U.S. manufactured 30 A RVs. It is also equipped with a cord 5 connected to the Primary of the Transformer for a 16 Amp Max Foreign Current Rating for use in connecting to receptacles normally present in foreign RV campgrounds. The unique plug 6 on the end of the power cord 5 of a U.S. 30 A RV 29 has three prongs 22,23,24 and serves as the male fitting for the female counterpart 3 on the transformer 1. Two of these prongs 22,23, namely those connected to the hot 10 and neutral 8 leads, are comparatively long and narrow, not round like most such prongs of male electrical fittings. Moreover they 22,23 are angled as opposed to parallel with respect to each other. Thus the female fitting or receptacle 3 of the present transformer and its hot and neutral receptors 10,8 must also be long, narrow and angled to receive the plug 6 of the 30 A RV 15. If extended in their longer dimensions these receptors 10,8 would meet to form a right angle.

None of the foregoing specifically identified components are critical to the present invention since available alternatives known to those skilled in the art of manufacturing transformers can be substituted without detracting from the essential features of the present invention required to step down 220-240 volts of electricity to 110-120 volts and deliver at least 30 amps of current from a foreign source of electricity to a U.S. 30 A RV. The receptacle 3 on the output side of the transformer 1 must be compatible with the standard plug on the end of the power cord of a 30 A U.S. manufactured RV, i.e., serve as a female fitting suitable for connecting to the male fitting on the end of the power cord of a 30 A U.S. built RV. As described the transformer 1 has the capacity to convert 220V 50 hz 16 A current to 120V 60 hz 30 A current output load capacity to allow full use of individual electrical appliances in a 30 A US RV. It operates as a single phase autotransformer that is copper wound and ventilated in a NEMA 1 enclosure 2. On its output side it has a 30 Amp Cooper 1263 Receptacle 3 specifically designed for U.S. manufactured 30 A RV use. On its input side it employs a 20 foot 10/3 SJT Cord 5 with a foreign country plug 6 suitable for use in the sockets of the country of intended use. Adapters can be used where necessary to match the sockets of other countries. Thus the depicted embodiment operates as a single phase autotransformer and also a general purpose copper wound auto transformer. The GRVP is ventilated in a NEMA enclosure 2 and is breaker 4 protected.

The product of the present invention is unique in its plug-and-play capability. The overseas user can simply plug a U.S. manufactured RV 15 into the transformer 1 and plug the transformer 1 directly into overseas electrical sockets.

Although the transformer of the present invention is designed primarily for use with RVs, it can also be used to provide electricity to any appliance, such as welding equipment, that requires 30 amps of current from a 220V source.

The foregoing provides a general description and a preferred embodiment of the present invention. It should be understood various substitutions, variations and modifications can be made by those skilled in the art without departing from the spirit and scope of the invention as further delineated in the following claims.

The invention claimed is:

1. A transformer for use in a U.S. built 30 Amp recreational vehicle having (1) an input side and an output side and (2) a circuit to convert 220 volts of electricity to 120 volts of electricity, the transformer further comprising
    (a) a cord having a first end and a second end, hard wired at the first end into the circuit on the input side of the transformer and a plug at the second end to connect to receptacles wired for 220 volts, 50 hertz and 16 amperes located at campgrounds outside the United States and
    (b) a receptacle on the output side of the transformer for receiving an industry wide standard plug connected to a power cord from the 30 Amp recreational vehicle wired for 120 volts, 60 hertz and 30 amperes of electricity, the industry wide standard plug including two narrow flat sided angled prongs that replicate each other in shape and size and intersect at an approximate right angle when extended toward each other.

2. The transformer of claim 1 further comprising a hot lead emanating from the circuit and a circuit breaker located on the hot lead.

* * * * *